United States Patent [19]
Randall

[11] 3,739,928
[45] June 19, 1973

[54] THREE-POINT HITCH LOG SKIDDING ATTACHMENT

[76] Inventor: Louis E. Randall, Box 117, Mio, Mich. 48647

[22] Filed: Mar. 18, 1971

[21] Appl. No.: 125,587

[52] U.S. Cl. ............ 214/85.5, 212/7, 280/415 A, 172/439
[51] Int. Cl. ............................................. B60p 1/00
[58] Field of Search............ 214/766, 130 R, 85.5, 214/523; 212/7; 254/139.1; 172/439, 440–445; 280/415 R, 415 A, 402

[56] References Cited
UNITED STATES PATENTS

| | | | |
|---|---|---|---|
| 3,576,266 | 4/1971 | Widley | 214/85.5 |
| 3,004,677 | 10/1961 | Reynolds | 214/766 |
| 2,736,442 | 2/1956 | Westholt | 214/130 R |
| 2,493,150 | 1/1950 | Kroger | 254/139.1 |

FOREIGN PATENTS OR APPLICATIONS

| | | | |
|---|---|---|---|
| 173,379 | 11/1960 | Sweden | 172/439 |

Primary Examiner—Albert J. Makay
Attorney—Harness, Dickey & Pierce

[57] ABSTRACT

There is herein disclosed a new and novel device comprising, in combination, a tractor with a three-point hitch assembly mounted on the rear end thereof, a frame connected to the hitch assembly, an elevated roller assembly mounted on the frame having a fairlead roller rotatable about a horizontal axis, and a power operated winch for pulling a cable over the fairlead for hauling a timber load to the vehicle and subsequently towing the load during movement of the tractor.

20 Claims, 5 Drawing Figures

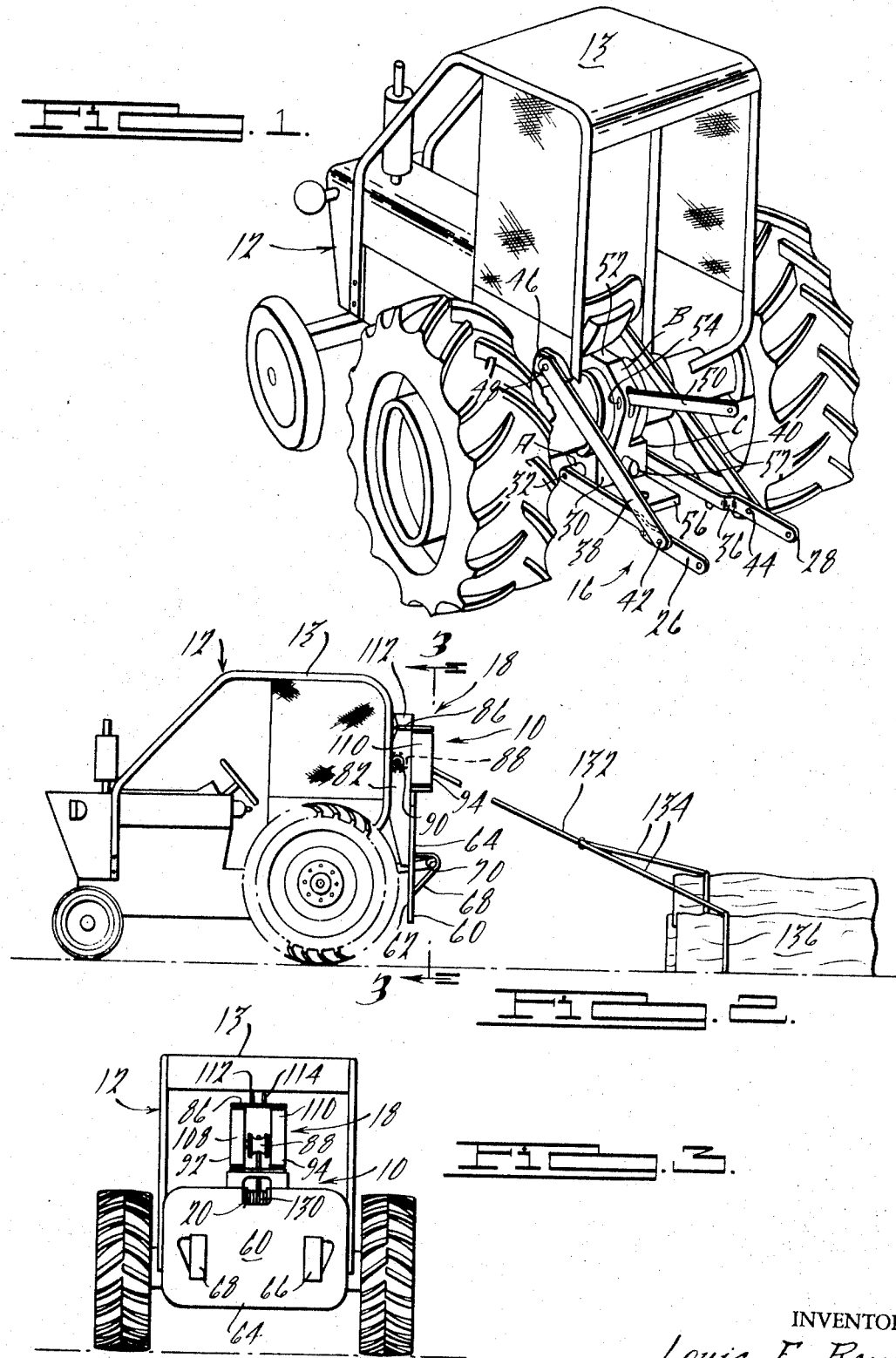

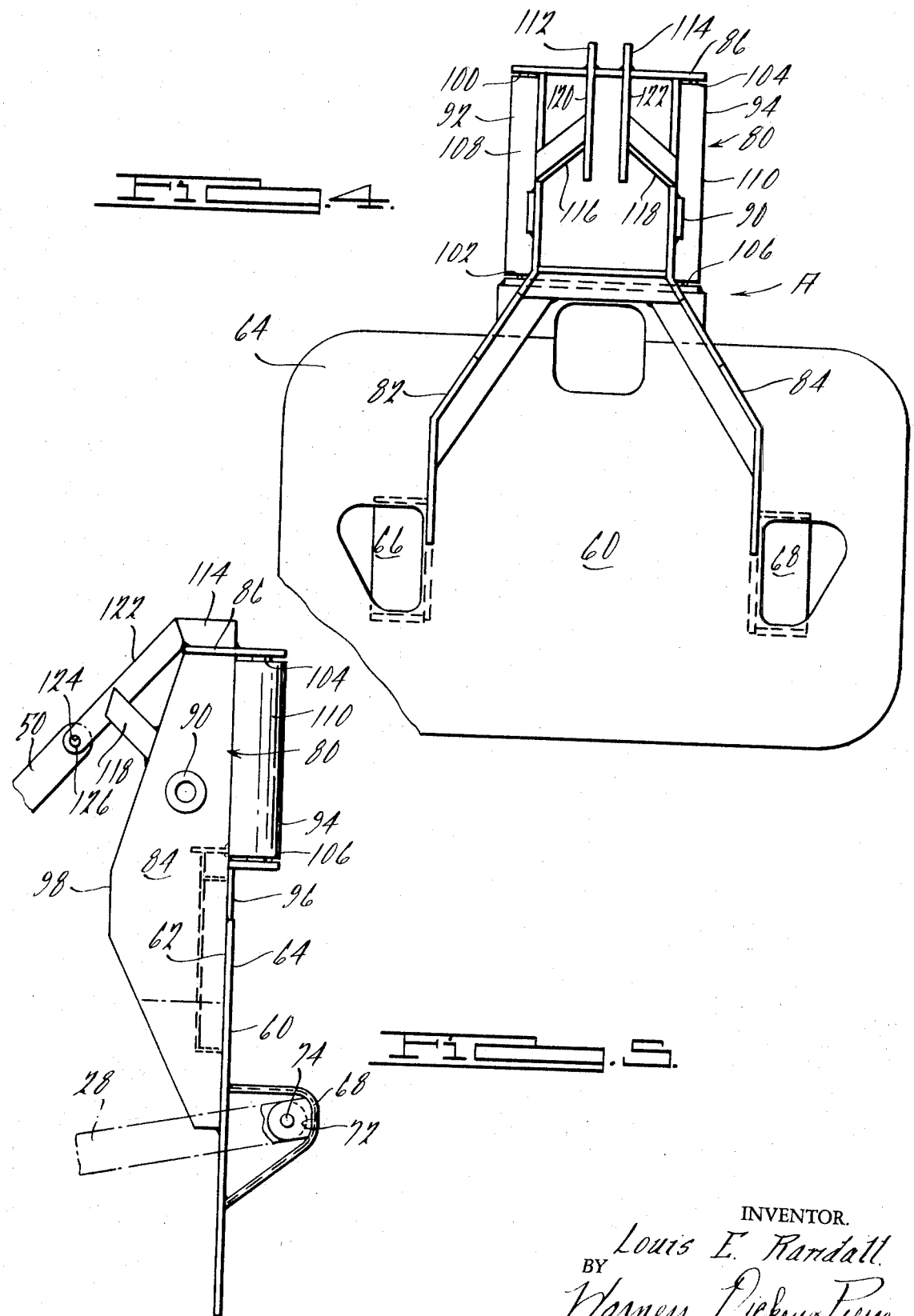

THREE-POINT HITCH LOG SKIDDING ATTACHMENT

BACKGROUND OF THE INVENTION a. Field of the Invention

This invention relates, generally, to agricultural implements and, more particularly, to log skidding attachments for use in logging operations.

b. Description of the Prior Art

The logging industry in the United States employs as many different logging techniques as there are different logging regions and tree types. The most common grouping consists of felling, yarding, towing or ground skidding and decking. During the first or "felling" phase, a plurality of trees are selected for cutting and are thereafter felled by using any of various types of manual or power driven saws, hydraulic shears or the like.

In the second or "yarding" phase, the cut trees are brought together into a yard. This is accomplished by paying out a cable from the winch by running it up and over a fairlead roller and out to a distinctly located log or bundle of logs. Thereafter, the cable is secured to the log bundle by using a multiplicity of choker ferrules attached to the end of the cable. After the logs are choked, the winch is payed back towards the tractor. The logs are drawn or yarded toward the tractor from distances of a few yards or up to a quarter mile depending upon the size of the winch and the length of the cable secured thereto.

During the third phase, the logs are towed or "ground skidded" toward a central assembly or loading area. With the logs directly in back of the vehicle, the operator can lift one end of the bundle free of the ground by taking up on the cable. As the cable is reeved in over the fairlead roller, it lifts the near end of the bundle, thus placing the cable under considerable tension. Thereafter, the tractor "roads" the bundle of logs to the loading area.

The fourth phase consists of severing the limbs and branches from the trees and the cutting thereof into conventional cord lengths of 4 feet by 4 feet by 8 feet.

The paper industry has a tremendous and continuing need for pulp wood or soft wood, which is generally used in the making of paper. The types of trees found to be most useful for this purpose include spruce, aspen, pine and hemlock, among others. The area to which these trees are most endemic are the South, the North Central States and the Great Lakes region. Operating throughout these areas are a myriad of people engaging solely or diversifiably in these activities. The equipment employed is both complex and expensive, requiring a strong capital structure in order to build up a pool of such equipment.

Throughout the North Central and Great Lakes region, however, a sizable number of persons engage in the aforementioned activities both singly and in small groups. Their efforts in these areas are usually during the winter months when crop growing is suspended because of the harsh climatic conditions. Heretofore, they have been handicapped in that the equipment used in these operations is very expensive, hence placing it beyond the reach of the small farmer or rancher. Through the use of the present invention, therefore, the conventional tractor can be easily adapted to off-season work.

The present invention has been specifically adapted to overcome both the structural defects existent within the older devices as well as to provide an inexpensive device for use by small, geographically separate operators. It has been found that most farmers possess a three-point hitch and, because it is generally hydraulically operated, it comes fully attached as an integral, component feature of many tractors. It is used as a means by which the majority of agricultural implements are attached to the tractor. It is particularly advantageous in that implements can be quickly and easily connected and disconnected; the implements can be raised from the ground via the hydraulic system connected through the lower links which can lift any device off the ground by as much as 24 inches; the controls are conveniently located astride the operator; the upper link serves as a steadying point throughout all operations keeping the implement tandemly located abaft the tractor and generally in line with the main body thereof obviating the problem of lateral shift; and the hitch allows the tractor to be adapted for a myriad of other, nonagricultural types of uses.

The devices presently on the market utilize, in combination, a power operated winch assembly, a fairlead roller assembly, and usually, either an arch or a derrick and boom type of assembly of various dimensions. Some have been attached directly to the tractor, while others have been trailed behind the tractor in the form of a separate wheeled or track assembly. The prime disadvantage inherent in the use of an arch is borne of the fact that every manipulation or actuation of the arch removes weight from and exerts a lifting force upon the tractor through the medium of the tension in the cable and the pull of the winch. Thus, the prime disadvantage of all logging arches is their tendency to vertically lift the tractor, thereby decreasing the available tractive force.

Many of the other devices have been plagued with faults, among which are the excessive width of the apparatus and limitations as to maneuverability and excessive weight.

The present invention overcomes the above enumerated faults through the aforementioned combination.

SUMMARY OF THE INVENTION

This invention relates, generally, to agricultural implements and, more particularly, to log skidding attachments for use in logging operations.

It is a general object of the present invention to provide a new and improved log skidding attachment which is efficient, durable and of simple construction whereby it will not only be economical to commercially manufacture, but which also will have a long operational life.

This and other objects of the present invention are accomplished by a construction which is so reduced in the number and character of its component parts as to approach the ultimate in structural simplicity to thereby epitomize economy in its manufacture, installation and maintenance.

The device includes a tractor with a three-point hitch assembly mounted on the rear end thereof. A frame is connected to the hitch assembly and includes an elevated roller assembly having a fairlead roller rotatable about a horizontal axis. A power actuated winch is mounted on the rear of the tractor and has a cable which is payed out over the fairlead roller.

Once a plurality of logs have been cut, the tractor will be moved as close to the site as possible allowing the cable to be payed out to a point whereby it is juxtaposed to the logs to be roaded. If the tractor cannot effectively ingress to the area where the logs have been cut, it may be parked at a distance of up to a quarter mile. This will necessitate the use of a larger winch with a longer cable. This consideration becomes particularly relevant depending on the size of the tractor and the availability of space for accommodating the larger winch. A plurality of choker ferrules are attached to the end of the cable. The ferrules are slip-knotted and when placed around the log, automatically take up a self-tightening orientation thereabout. When the chokers have been placed around the logs to be skidded, the cable is reeved in over the fairlead roller until the bundle of logs rests abaft the tractor. One end of the bundle is lifted free of the ground thus facilitating easier roadability of the entire load during the roading phase of the operation.

The various objects and advantages and the novel details of construction of one commercially practical embodiment of the invention will become more apparent as this description proceeds, especially when considered in conjunction with the accompanying drawings.

BRIEF DESCRIPTION OF THE DRAWINGS

FIG. 1 is a perspective view of a conventional tractor illustrating the hitch assembly used in combination therewith.

FIG. 2 is a side elevational view of the log skidding attachment of the present invention mounted on the rear end of the tractor of FIG. 1.

FIG. 3 is a rear view of the attachment illustrated in FIG. 2.

FIG. 4 is an elevational view of the log skidding attachment constructed in accordance with the preferred embodiment of the present invention.

FIG. 5 is a side elevational view of the attachment illustrated in FIG. 4 looking in the direction of the arrow A.

DETAILED DESCRIPTION OF THE PREFERRED EMBODIMENT

Referring now in detail to the drawings and, in particular, to FIGS. 2 and 3, a log skidding attachment 10, in accordance with an exemplary embodiment of the present invention, is shown in operative association with a tractor 12 of any conventional design.

A frame 14 serves as the principal mode by which the attachment 10 is secured to a hitch (FIG. 1), generally designated by the numeral 16, which forms an integral part of the tractor 12. A roller assembly 18 is attached to the upper part of the frame 14 and serves to guide a cable coiled about a power operated winch 20.

The tractor 12, which is used with this invention, is generally conventional and is shown as having a shortened wheel base. This is important in logging operations because of the need for a maximum of maneuverability. An enclosed canopy 13 is of the heavy duty tube type having a screen panel therearound. This provides, not only for full operator vision, but also protection against the possibility of the timber load entering the confines of the tractor, thus injuring the operator.

As best seen in FIG. 1, a three-point hitch assembly 16 is illustrated in accordance with the conventional design and is shown in its hydraulically operative relationship with the tractor 12. The hitch, in its present form, was developed in 1935 by the late Harry Ferguson, and since that time has achieved a wide measure of popularity due to its flexibility and versatility. As a result of its wide usage, the American Society of Automotive Engineers standardized the dimensions of the three-point hitch in 1959, and the brief discussion hereinafter will be generally in accordance with those standards.

A pair of lower links 26 and 28 are pivotally mounted onto both sides of a trumpet housing 30 which is mounted generally below the rear driving axle and intermediate the two rear wheels of the tractor. The points of attachment of the various linkages with the tractor are generally referred to as link points and are best illustrated in FIG. 1 by the letters A, B and C. As will be seen, the lower links 26 and 28 have their point of attachment to the trumpet housing 30, with the link 26 shown attached thereto through link pin 32. The links 26 and 28 are curved angularly outwardly, as best shown by the reference character 36 of link 28, at a point approximately two-thirds of the distance rearwardly of its point of attachment to the housing 30. A pair of draw links 38 and 40 are connected to the lower links 26 and 28 at a point rearwardly of the angular portion 36 by a pair of pins 42 and 44. At the other end thereof, the draw links 38 and 40 are connected to a pair of rock shaft arms 46 with link 38 specifically shown attached through pin 48. The arms 46 are pivotally mounted to a rock shaft (not shown) which is positioned beneath the driver's seat and generally perpendicular to the longitudinal axis of the tractor 12.

An upper link 50 of the hitch 16 is generally known as the third point of attachment and is secured to a hydraulic package 52 (known sometimes colloquially in the trade as a C-2 option) by means of an upper link pin 54. As can also be seen, a suitable L-shaped drawbar 56 and power takeoff shaft 57 are situated intermediate lower links 26 and 28 and may be utilized in the conventional manner. The drawbar 56 and power takeoff 57 serve no usefulness in connection with the use of the present invention and are shown and described for illustrative purposes only.

The frame 14 of the log skidding attachment 10 consists of a rectangularly shaped plate 60, having an inner surface 76 and an outer surface 78. A pair of bracket members 66 and 68, generally U-shaped in cross section, are welded to the outer surface 78 of plate 60 and define a cavity therein adapted to house a pair of clamps 70 and 72 for hingedly connecting said attachment 10 to the lower links 26 and 28 of the hitch assembly 16. As seen in FIG. 5, for example, the lower link 28 is attached to the bracket 66 by means of hitch pin 74.

As best seen in FIGS. 4 and 5, a fairlead roller assembly, generally designated by the numeral 18, comprises a hook-like structure 80 having a pair of legs 82 and 84 and a roof 86. The structure 80 has an inner surface 96 and an outer surface 98. The legs 82 and 84 depend from said roof 86 and serve as the means by which the assembly 18 is attached integrally to the inner surface 76 of the plate 60. The hood-like structure 80 serves to house a generally horizontal, concavely shaped fairlead roller 88 which is journaled into the legs 82 and 84 and is held therein by suitable screws, bolts or the like 90. A pair of elongated L-shaped brackets 92 and 94 are secured to the outer face 98 of said structure 80. A plurality of flanges 100, 102, 104 and 106 project laterally from the brackets 92 and 94 and serve to secure therebetween a pair of vertically disposed rollers 108 and 110 which are journaled in the flanges 100, 102, 104 and 106 by suitable screws, bolts or the like. The rollers 108 and 110, unlike the roller 88, are of generally uniform diameter throughout their entire length. A pair of fingers 116 and 118 project upwardly from legs 82 and 84 and serve to retain a pair of arms 120 and 122 which project downwardly from roof members 112 and 114 integrally affixed to the roof of structure 80. An opening 124 is disposed at the downwardmost point of said members 112 and 114 and serves as the point of attachment with the upper link 50 by means of a hitch pin 126.

A heavy duty winch 130 with approximately 8,000 to 15,000 pounds bare drum line pull is mounted on the rear frame of the tractor 12. As best seen in FIGS. 2 and 3, the cable 132 is shown as being reeved from the winch 130 out and over the fairlead roller 88. A plurality of choker means 134 are attached to the outer end of the cable 132 and serve as the means by which the cable 132 is attached to the logs 136. Although the cable 132 is shown with a plurality of chokers 134 attached to the outer end thereof, it is contemplated that the winch 130 of the present invention may have a plurality of cables which would extend therefrom each containing a choker ferrule 134 at its terminal point thereof. Such a winch may be desired, particularly when it is contemplated that logging operations will be conducted in such a way that logs will be scattered throughout a fairly large area instead of being congregated in a yard. Otherwise, the chokers 134 would have to be of an extraordinary length.

In the operation of the present invention, the tractor 12 with the log skidding attachment 10 mounted thereon is moved to the area where the logs have been cut and are ready for yarding. The cable is free spooled over the fairlead roller and out to the plurality of logs which have been previously cut. The chokers located on the end of the cable or cables are wrapped around each log in such a way as to form a slip-knot which tightens as tension is applied to the cable. Once the logs have been secured to the cable, it is reeved back in over the fairlead roller and recoiled about the winch drum. The side rollers serve to ease the reeving-in operation where the logs are located at various distances laterally of the tractor. The logs are dragged in until they abut the frame of the attachment. During this reeving-in and lifting operation, it will be noted that the power which tends to be pulled upwardly because of the tension on the cable caused by the downward pull of the logs. With many of the conventional devices, this upward force component tends to lift the rear axle of the tractor upwardly. With the present invention, however, this upward lift on the winch is balanced by an equal and opposite downward force asserted on the rear of the tractor by the attachment of the present invention as well as the additional weight which is placed on the upper link or steadying point of the three-point hitch assembly. Once the logs have been fully brought in and abut the frame of the log skidding attachment, the log bundle is then ready for the roading phase of the logging operation. Thus, the tractor is then moved to a central assembly or loading area with the logs being dragged thereafter. Such a ground skidding operation is conventional in the logging industry and with the additional weight of the present invention, the tractor will be less susceptible to skidding or sliding should the access roads be muddy or slippery.

It will also be seen that the height of the fairlead roller can also be simply and readily changed to provide an optimum value for each of the various operating conditions. It will be understood that the tractor utilizes large diameter wheels and the higher the fairlead, and consequently the higher the log load, the greater proportion of the weight of the load being pulled that will be placed on the vehicle. This reduces the friction of the load since the part not supported by the vehicle is dragged over ground which is usually very rough. Thus, the higher the load, the easier skidding becomes. This also minimizes damage to the logs. Generally speaking, the higher the load, the less horsepower required to move it. Another advantage to lifting the load and keeping as much of it as possible off the ground, is that the logs must subsequently be delimbed and cut into various cord lengths. Quite obviously, then, the less mud and gravel that is embedded in the trees, the less will be the cost of maintenance of the saws which might be used in these operations.

It will be seen that the tractor 12 is of the wheel type and has a generally shorter wheel base than most conventional tractors. Although it is contemplated that the attachment 10 of the present invention will find use with either type, the former is preferred because of its greater maneuverability — a critical element in most logging operations because of the restricted area in which the various operations must be carried on. It has also been found that the wheeled tractor is preferred to the track-type because of the many additional advantages which flow from the use of a wheeled tractor having a generally shortened wheel base. The tracks have been found to be expensive, noisy, excessively heavy and tend to present undue wear and tear as well as repair problems, especially in the woods. Furthermore, they have been barred from many state highways because of their tendency to tear up the roadbeds. The wheeled vehicle, on the contrary, has been found to be less expensive, lighter, easier to repair and less costly to operate. Furthermore, if correctly designed, it will assert more of a tractive pulling force than will a track-type tractor. Above all, it is easier to steer and control both on the open highway and in wooded areas.

It will, of course, be understood that further changes may be made in the form, details, arrangement and proportions of the parts without departing from the scope of this invention, which, generally stated, consists in the matter shown and described herein and set forth in the appended claims.

What is claimed is:

1. In combination with a tractor having front and rear axle members and a three-point hitch assembly cooperating with said tractor and having a pair of lower links and an upper link mounted intermediate said lower links, the improvement comprising,
    a frame for supporting a roller assembly and equipped at its inner end with means for supporting and towing connection with said tractor,
    an elevated fairlead on said frame and including a roller rotatable about a horizontal axis,
    a pair of like spaced-apart parallel rollers freely pivotable about a vertical axis,
    a winch for pulling a cable passing over said fairlead to a timber load for hauling said load to the tractor and for subsequently towing the load during travel of the tractor, means cooperating with said cable for gripping said timber load, and bracket members projecting outwardly from said frame, means associated with said bracket members and said roller assembly for connecting said frame to said three-point hitch at a plurality of points thereon.

2. The combination of claim 1 wherein said tractor has a shortened wheel base and a plurality of pneumatic tires.

3. The combination of claim 1 wherein said lower links of said hitch assembly are connected to said tractor at a point adjacent the rear axle thereof and said upper link is connected to a hydraulically operated power supply mounted above and forward of the rear axle of said tractor.

4. The combination of claim 1 wherein said frame is rectangularly shaped.

5. The combination of claim 1 wherein said elevated fair-lead roller is concavely shaped.

6. The combination of claim 1 wherein said like spaced-apart parallel rollers are of equal dimension throughout their entire length and are mounted laterally and rearwardly of said fairlead roller.

7. The combination of claim 1 wherein said winch assembly is mounted on the rear end of said tractor and has a rotatable drum upon which is coiled a cable for hauling and hoisting said timber load.

8. The combination of claim 1 wherein said winch assembly and said roller assembly is oriented intermediate the lower spaced-apart links of said three-point hitch assembly.

9. The combination of claim 1 wherein said gripping means cooperating with said cable comprise a plurality of choker ferrules which are slip-knotted about said timber load.

10. The combination of claim 1 wherein said bracket members are substantially U-shaped.

11. The combination of claim 1 wherein a pair of clamps are mounted within the cavity defined by said substantially U-shaped bracket members and serve as the means by which said frame is connected to the lower links of said hitch assembly.

12. The combination of claim 1 wherein said means for connecting said frame and said roller assembly to said tractor comprise a pair of arms cantilevered downwardly from the inner face of said roller assembly and adapted to be connected to the upper link of said hitch assembly.

13. The combination of claim 1 wherein a pair of fingers project upwardly and angularly from the inner face of said roller assembly in buttressing relationship to said cantilevered arms.

14. A log skidding attachment in combination with a tractor having a winch and a three-point hitch of the type including a pair of horizontally spaced lower links supported generally below a rear axle of the tractor and an upper link located above said lower links and substantially centrally spaced therebetween, the attachment comprising: a base plate pivotably connected to said pair of lower links; a roller supporting bracket located above an upper edge of said plate and pivotably connected to said upper link; and a horizontally extending fairlead roller rotatably supported by said bracket, said roller being located above the horizontal axis of said winch and adapted for elevating a cable of said winch.

15. The combination as recited in claim 14 wherein said base plate includes a pair of spaced openings for individually receiving one end of said lower links, and which includes a pair of bracket members connected to said plate and individually pivotably connected to said lower links.

16. The combination as recited in claim 14 which includes guide means on opposite sides of said roller for retaining said cable thereon.

17. The combination as recited in claim 16 wherein said guide means includes a pair of vertically extending rollers rotatably supported by said roller supporting bracket.

18. The combination as recited in claim 17 wherein said roller supporting bracket includes first and second parallel spaced flange members which project outwardly from said base plate and which support said pairs of rollers.

19. The combination as recited in claim 18 wherein said fairlead roller is disposed on one side of said base plate and said pair of vertical rollers are disposed proximate an opposite side.

20. The combination as recited in claim 14 which includes at least two laterally spaced leg members forming opposite sides of said roller supporting bracket, each of said leg members being fixedly connected to said base plate.

* * * * *